No. 746,663. Patented December 15, 1903.

UNITED STATES PATENT OFFICE.

ARTHUR C. BOURDEAU, OF BATTLECREEK, MICHIGAN, ASSIGNOR TO BATTLE CREEK PURE FOOD COMPANY, LTD., OF BATTLECREEK, MICHIGAN, A CORPORATION OF MICHIGAN.

PROCESS OF MAKING MALTED FLAKES.

SPECIFICATION forming part of Letters Patent No. 746,663, dated December 15, 1903.

Application filed February 3, 1902. Serial No. 92,315. (No specimens.)

*To all whom it may concern:*

Be it known that I, ARTHUR C. BOURDEAU, a citizen of the United States, residing at Battlecreek, in the county of Calhoun and State of Michigan, have invented a certain new and useful Process of Producing Predigested Flaked Grain or Cereal, of which the following is a full, clear, and exact specification.

My invention relates more particularly to a process for producing flaked food of the same general character as that set forth and claimed in United States Letters Patent No. 651,776, granted June 12, 1900, to Jesse D. Bourdeau; and the invention is designed as an improvement on the process heretofore followed for producing the said flaked food and as set forth in the said patent; and the invention has for its primary object to produce in an improved and efficient manner and on a commercial scale a flaked food from grain or cereal which shall be fully cooked and baked and in which the starch shall be converted, so far as possible, into dextrine and maltose or, in other words, predigested, whereby there is produced a food or alimentary product ready to eat without further cooking and easy of assimilation, and consequently especially adapted as a food for invalids and others having weak or impaired digestion.

Another object of the invention is to make the flakes to a considerable extent impervious to moisture.

With these ends in view my invention consists in certain features of novelty, hereinafter more fully described, and particularly pointed out in the claims.

In the production of this product by the methods heretofore followed it has been customary to subject the starch of the grain to the action of diastase and afterward to heat for the purpose of converting the starch into dextrine and maltose, and with that end in view the attempt has been made to uniformly saturate the starch-cells with the extract of barley-malt, the kernels of the grain being at the same time passed between rollers which flattened them individually into flakes, which latter were subsequently subjected to a sufficient degree of heat for baking them and completing the transformation of the starch into maltose and dextrine. It has been found in practice that while this former method is entirely capable of producing the product described in said patent it is, however, slow and only partially satisfactory in treating and handling a considerable mass of grain or cereal in bulk with desired speed.

The principal aim of my invention is to treat and handle large quantities of grain or cereals with great rapidity, nevertheless with such absolute uniform certainty as to swell the starch-cells of each individual kernel of the grain without setting up any appreciable or detrimental degree of fermentation or rendering the kernels so soft or mushy as to cause them to lose their individuality in the flaking process, whereby each kernel will be susceptible of readily absorbing a requisite percentage of diastase and will be in a condition best adapted for flaking and having the diastase at the same time uniformly impressed into intimate association with the starch-cells.

The process may be carried out for producing flaked cereal or food from any grain or cereal and will be substantially the same in each instance. As an example I will describe the process as carried out for producing the product from wheat, and it will readily be understood from the description of that which follows how the process may be adapted for other cereals.

In carrying out my process the kernels of the grain or cereal are first cleaned of all dirt and fuzzy particles adhering thereto by passing the same through any suitable scouring-machine or subjecting them to any of the well-known scouring processes. The kernels thus denuded of their objectionable refuse are soaked in cold water for about twelve hours, more or less, depending upon the hardness or texture of the kernels, for the purpose of causing them to swell as far as possible without getting soft, whereby they are better adapted for treatment in the cooking process which is to follow. The water is now drained off and the grains subjected to the action of steam under from ten to eighteen pounds' pressure at a temperature of about 235° Fahrenheit for the duration of from fortyfive to sixty minutes or until substantially all the starch-cells shall have swollen to their utmost and popped open and the grain cooked, preferably as thoroughly as possible without causing the kernels to disintegrate or become so soft as to cause them to lose their individuality in the subsequent treatment. At the conclusion of the described cooking operation the mass is conducted into a separate bin or tank, where it is allowed to stand for about two hours, it being subjected to the action of air-currents on the way from the cooker to such bin, which drive off some of the heat and moisture, leaving sufficient moisture, however, to effect further swelling and curing of the kernels, which are now cooled and thoroughly aerated to prevent fermentation. After the grain has been thus cooled and dried it is further handled and aerated at short intervals of from two to three hours apart for the purpose of causing it to approach as far as possible the state of fermentation without actually fermenting, it being found in practice that by allowing it to remain in bulk for two or three hours in this swollen state the advance symptoms of fermentation will appear; but if then lighted up in such a manner as would result from passing it in piecemeal or in a stream from one bin to another these symptoms are arrested and the grain may again stand in bulk two or three hours longer before there is danger of such symptoms appearing again. Thus by changing the grain from one bin to another from two to five times it receives the benefits of a long standing in the presence of the absorbed moisture while in its swollen state, producing to the utmost that mechanical action or distortion of the cells which immediately precedes and is a prerequisite to fermentation, and at the same time actual fermentation is prevented from taking place. In some of these changing-bins just referred to it is desirable to subject the grain to the action of air, preferably cold air, forced up through the mass; but care should be taken lest overexposure to the air cause the kernels to dry and harden on the outside. This step of the process—i. e., allowing the cooked and swollen grain to stand in bulk during more or less aeration at intervals—also effects changes, whether chemical or mechanical, throughout the entire substance of the kernels, which render them more tender, resulting in a much more crisp and palatable flake than can be produced by flaking the kernels directly after cooking. The grain, now swollen to the utmost without being soft, with its fibers porous, like a sponge, is ready for the predigesting process and to this end is treated with diastase, to which it is subjected in any suitable mixer in which the diastase is introduced with the grain in the form of extract of barley-malt, the mass being about five to seven per cent. malt extract, but the invariable rule being that a sufficient percentage of malt be employed to insure the impregnation therewith of every kernel of the grain. Before the malt is added, however, the grain is heated uniformly to a temperature of from 95° to 140° Fahrenheit to make it more readily absorb the malt extract. After the malt extract has been added, and preferably during the mixing operation, it may be salted to suit the taste. This heating and malting operation requires about thirty minutes. After being thoroughly malted and salted the grain is stored in bulk for about two hours to afford further opportunity for the malt to find its way into the inner cells, after which the individual kernels are flaked in any suitable way, as by passing them between rolls, which serves the two-fold purpose of converting each kernel into a flake best suited for uniform baking or toasting and uniformly impressing the malt into intimate association with the cells of the grain. The flaked and malted kernels thus produced are now baked at a suitable temperature—say 300° Fahrenheit—in any appropriate oven until crisp and thoroughly cooked and the proportion of starch natural to the grain transformed by the action of the heat and the diastase into dextrine and maltose or that form of sugar which may be termed "dextrose," which is desirable, because of its predigested character and the readiness with which it may be assimilated by the stomach.

The process thus described results in toasted flakes, browned more or less, according to the degree of baking to which they are subjected, each representing a single kernel of grain, crisp and brittle, thoroughly and uniformly cooked throughout, with its starch predigested and each veneered with a hard varnish-like substance brought to the surface by the action of the heat on the chemically-treated ingredients of the grain and which is in part the natural converted sugar and in part dextrine, with a probable percentage of gluten, which make the flakes impervious in a large degree to the action of moisture, thus enabling the product to preserve its desirable crispness for a great length of time while exposed to the atmosphere and also preventing it from becoming mushy or soft when mixed with cream or other liquid, a feature which adds largely to its value, because, as is well understood, the dry crisp food necessitates mastication with consequent action of the salivary glands.

Having thus described my invention, what I claim as new therein, and desire to secure by Letters Patent, is—

1. The process of producing flaked grain, which consists in swelling and curing the grain by cooking the grain in the presence of moisture without destroying the individuality of the kernels and then removing the surplus moisture, impregnating the grain with diastase by mixing the cooked grain, while swollen, with liquid diastase and afterward allowing it to stand in the presence of the diastase to permit the latter to work into the cells of the grain, and finally mashing the individual kernels of the grain into flakes, substantially as set forth.

2. The process of producing flaked cereal which consists in first swelling the cereal by cooking it in the presence of moisture; second, curing the cereal by aerating and cooling it; third, impregnating the cereal with diastase by again heating the aerated cereal and subjecting the same to the action of diastase while heated, and subsequently crushing the individual kernels into flakes while moist with the diastase, and, fourth, roasting the flakes, substantially as set forth.

3. The process of producing flaked cereal, which consists in first swelling the cereal by soaking the cereal in water until swollen, and draining off the water and cooking the cereal in the presence of moisture without destroying the integrity or individuality of the kernels; second, curing the cereal; third, impregnating the cereal with diastase by subjecting the cooked cereal to the action of diastase and subsequently mashing the kernels of the cereal into thin flakes, and, fourth, roasting the flakes, substantially as set forth.

4. The process of producing flaked grain, which consists in first swelling the grain by soaking the same in cold water for several hours until swollen, draining off the water and subjecting the swollen grain to the action of steam until cooked; second, curing the grain by subjecting it to the action of air-currents; third, impregnating the grain with diastase by again warming the cooled and dried grain and subjecting it to the action of diastase and allowing it to stand in the presence of the diastase until saturated therewith, and thereafter squeezing the individual kernels into thin flakes while moist with the diastase, and, fourth, roasting the flakes, substantially as set forth.

5. The process of producing flaked cereal, which consists in first swelling the cereal by soaking it in cold water until swollen as far as possible without being soft, draining off the water and cooking the swollen cereal in the presence of steam at about 235° Fahrenheit until substantially all of the starch-cells are swollen to their utmost without becoming soft, and partially cooling and drying the cooked cereal and allowing the same to stand to effect further swelling and curing thereof; second, curing the cereal by aerating and cooling the mass to prevent fermentation; third, impregnating the cereal with diastase by again warming the cooled cereal, and while warm mixing it with diastase and thereafter squeezing the individual kernels to transform them into thin flakes and impress the diastase thereinto, and, fourth, roasting the flakes, substantially as set forth.

ARTHUR C. BOURDEAU.

Witnesses:
WM. F. NEALE,
GEO. F. NEALE.